United States Patent
Miner

(10) Patent No.: US 12,470,756 B1
(45) Date of Patent: Nov. 11, 2025

(54) NARRATION-ENHANCED AUDIO-ONLY CONTENT DELIVERY SYSTEM AND ASSOCIATED NARRATION-ENHANCED AUDIO-ONLY CONTENT DELIVERY

(71) Applicant: Michael Arthur Inez Miner, Colbert, WA (US)

(72) Inventor: Michael Arthur Inez Miner, Colbert, WA (US)

( * ) Notice: Subject to any disclaimer, the term of this patent is extended or adjusted under 35 U.S.C. 154(b) by 0 days.

(21) Appl. No.: 18/401,728

(22) Filed: Jan. 2, 2024

(51) Int. Cl.
*H04N 21/233* (2011.01)
*H04N 21/472* (2011.01)
*H04N 21/81* (2011.01)

(52) U.S. Cl.
CPC ......... *H04N 21/233* (2013.01); *H04N 21/472* (2013.01); *H04N 21/8106* (2013.01)

(58) Field of Classification Search
None
See application file for complete search history.

(56) References Cited

U.S. PATENT DOCUMENTS

2019/0191224 A1* 6/2019 Newell ................. H04N 21/84

* cited by examiner

*Primary Examiner* — Omar S Parra
(74) *Attorney, Agent, or Firm* — Plager Schack LLP; Mark H. Plager; Stephen Hallberg

(57) ABSTRACT

A narration-enhanced audio-only content delivery system is disclosed. The narration-enhanced audio-only content delivery system is configured to extract audio content from audio-visual content, generate a narrative describing the audio-visual content, generate a composite narration-enhanced audio-only content item that combines the extracted audio content with the generated narrative, and deliver the narration-enhanced audio-only content item to a user for listening playback. The narration-enhanced audio-only content delivery system hosts a service that allows a user to listen to audio along with narration based on any audio-visual content without delivery of the visual content. Examples of the audio-visual content include movies, TV shows, documentaries, and other media made for TV, cable, theater, streaming services, and other applications/services providing similar services.

9 Claims, 3 Drawing Sheets

NARRATION-ENHANCED AUDIO-ONLY CONTENT DELIVERY SYSTEM AND ASSOCIATED NARRATION-ENHANCED AUDIO-ONLY CONTENT DELIVERY

BACKGROUND

Embodiments of the invention described in this specification relate generally to audio content systems, and more particularly, to a narration-enhanced audio-only content delivery system is configured to extract audio content from audio-visual content, generate a narrative describing the audio-visual content, generate a composite narration-enhanced audio-only content item that combines the extracted audio content with the generated narrative, and deliver the narration-enhanced audio-only content item to a user for listening playback.

Many people listen to audio-only content on their phones, tablets, computers, or other devices. Movies, TV programming, videos, and other similar streaming applications offer audio-visual content for people to watch and listen to for entertainment, information, relaxation, or other purposes.

However, the current systems for streaming audio-visual content normally require users to be seated or otherwise positioned in a sedentary manner to absorb the content. This is a result of the very nature of the audio-visual content which demands a person's focal attention. Consequently, people end up sitting and watching TV programs, movies, videos, etc., for long time periods which do not allow for free movement. In other words, unless they are OK with interrupting the viewing/listening experience, people just have to sit and watch. Yet, many people have mobile devices which allow them to stream audio-visual content on the device for viewing and listening. While this option enables a certain amount of freedom of movement, the fact is that most people end up glued to their mobile devices watching their preferred audio-visual content. This also has limitations on movement. For instance, a driver cannot drive a vehicle while watching a show on their mobile device.

Therefore, what is needed is a way for a person to listen to the audio portion of audio-visual content, such as TV programs, movies, etc., and to do so any time, any place, or in any form and from any device.

BRIEF DESCRIPTION

A novel narration-enhanced audio-only content delivery system and associated process are disclosed. In some embodiments, the narration-enhanced audio-only content delivery system is configured to extract audio content from audio-visual content, generate a narrative describing the audio-visual content, generate a composite narration-enhanced audio-only content item that combines the extracted audio content with the generated narrative, and deliver the narration-enhanced audio-only content item to a user for listening playback. In some embodiments, the narration-enhanced audio-only content delivery system hosts a service that allows a user to listen to audio along with narration based on any audio-visual content without delivery of the visual content. Examples of the audio-visual content include movies, TV shows, documentaries, and other media made for TV, cable, theater, streaming services, and other applications/services providing similar services.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
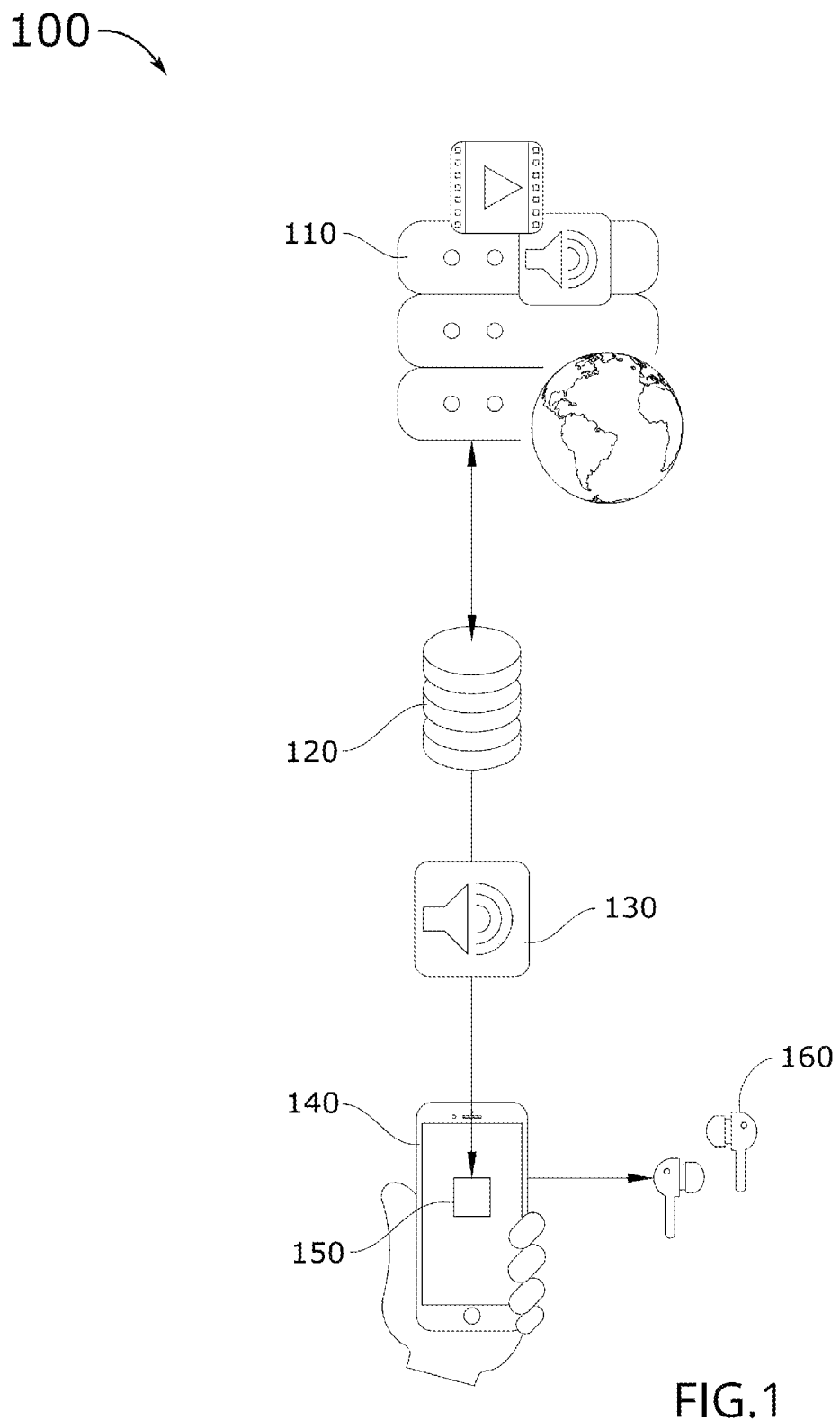
FIG. 1 conceptually illustrates a cloud-network architecture of a narration-enhanced audio-only content delivery system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the invention described in this disclosure are provided for a narration-enhanced audio-only content delivery system and associated process. In some embodiments, the narration-enhanced audio-only content delivery system is configured to extract audio content from audio-visual content, generate a narrative describing the audio-visual content, generate a composite narration-enhanced audio-only content item that combines the extracted audio content with the generated narrative, and deliver the narration-enhanced audio-only content item to a user for listening playback. In some embodiments, the narration-enhanced audio-only content delivery system hosts a service that allows a user to listen to audio along with narration based on any audio-visual content without delivery of the visual content. Examples of the audio-visual content include movies, TV shows, documentaries, and other media made for TV, cable, theater, streaming services, and other applications/services providing similar services.

As stated above, many people listen to audio-only content on their phones, computers, or other devices. Movies, TV programming, and other similar streaming applications offer audio-visual content for people to watch and listen to for entertainment, information, relaxation, or other purposes. However, the current system require users to be seated or otherwise positioned in a sedentary manner to absorb the content. Consequently, people end up sitting and watching TV programs or movies for long time periods which do not allow for free movement. In other words, unless they are OK with interrupting the viewing/listening experience, people just have to sit and watch. Yet, many people have mobile devices which allow them to stream audio-visual content on the device for viewing and listening. While this option enables a certain amount of freedom of movement, the fact is that most people end up glued to their mobile devices watching their preferred audio-visual content. This also has limitations on movement. For instance, a driver cannot drive a vehicle while watching a show on their mobile device. Embodiments of the narration-enhanced audio-only content delivery system and process described in this specification solve such problems by way of a software application-implementation of a narration-enhanced audio-only content delivery process that is configured to connect with a narration-enhanced audio-only content delivery system that enables users to listen to a stream of audio-only content that is from TV shows, movies, and other entertainment that involves audio and video/visual elements, but is also enhanced with narration. In this way, the narration-enhanced audio-only content delivery system allows users to listen to their favorite movies and shows while driving, working, or any other time on the go when watching TV or your phone is inconvenient.

Embodiments of the narration-enhanced audio-only content delivery system and process described in this specification differ from and improve upon currently existing options. In particular, some embodiments differ from existing audio-visual content streaming systems which normally do not provide mechanisms to take movies, TV shows, etc., with them for viewing and listening while simultaneously engaged in another activity that requires movement and focal attention, such as driving, working, performing physical tasks, and other activities that involve focus on visual aspects of the activity. By contrast, the narration-enhanced audio-only content delivery system and process of the present disclosure provides an application and cloud application service (with mobile and web gateways) that work together to provide audio-only content of the audio-visual content of a user's choice. In this way, the narration-enhanced audio-only content delivery system enables a person to take their favorite movies and shows anywhere they may go, but providing them in an audio-only format that is suitable for listening to while their focal attention is fixed on another activity. In addition, the cloud application service hosted by the narration-enhanced audio-only content delivery system enhances the audio-only stream of audio content by adding a narrative track to the audio-only content. The narrative track provides a narration explaining details of the viewable aspects of the content. Thus, by providing users with audio and added narration, the user can listen while doing anything and not miss the latest trending shows and movies.

The narration-enhanced audio-only content delivery system and process of the present disclosure may be comprised of the following elements. This list of possible constituent elements is intended to be exemplary only and it is not intended that this list be used to limit the narration-enhanced audio-only content delivery system and process of the present application to just these elements. Persons having ordinary skill in the art relevant to the present disclosure may understand there to be equivalent elements that may be substituted within the present disclosure without changing the essential function or operation of the narration-enhanced audio-only content delivery system and process.

1. User installs the mobile app, registers, and then launches the mobile app on their mobile device (the user may configure settings such as linking to one or more video streaming platforms).

2. The user searches for audio-visual content items (e.g., the user's favorite TV show, movie, documentary, or any other entertainment series on cable or streaming devices/apps/subscriptions).

3. After the content is found in the search and selected by the user, the system extracts the audio-only portion and (optionally) generates a narrative to combine with the audio-only portion, and then makes the audio-only content (with or without narrative) available to the user for streaming or download.

4. The user can then listen to the audio-only content through the mobile app while on the go (e.g., walking, riding a bike, etc.) or while performing daily tasks that require visual focus, such as working or driving where watching your movie or show might be dangerous, cumbersome, annoying, or restricted.

The narration-enhanced audio-only content delivery system and process of the present disclosure generally works by way of a software implementation, such as a mobile app, a web app, a traditional software program, desktop application, etc. Whatever implementation, the narration-enhanced audio-only content delivery system allows people to listen to their favorite audio-visual content and to do so while on the go when they cannot stop and focus on visual aspects of the content. The narration-enhanced audio-only content delivery system allows this for any audio-visual content, be it a show, a television program, a movie, a video, or any other visual program uploaded by a user or offered by movie/video streaming platforms. Providing an audio-only version of the audio-visual content is a way for users to go anywhere and listen to the audio by simply using headphones, earbuds, or listening out the internal mobile device speaker or Bluetooth connected speaker.

To make the narration-enhanced audio-only content delivery system and process of the present disclosure, a person (or developer) would design, code, and develop software as a mobile app or other software (e.g., a web app, a traditional software application or desktop application). The person/develop may also deploy a proprietary video streaming service or make external video streaming platforms configurable by individual users according to their needs. The person/developer would make the mobile app/software available for users to download (e.g., through a mobile app store supported by one or more mobile platforms, or through a web app link, software download link, etc.). The downloading and installing of the mobile app/software would be completed by each individual user. However, to access all features of the mobile app/software, the installing user would need to provide some linked streaming service (third party video streaming platform) or just use the proprietary streaming option or upload their own videos, movies, shows, or other audio-visual content. While each user can interact with the mobile app in order to listen to the extracted audio-only content of original audio-visual content from movies, shows, cable shows, TV, instructional videos, guidance videos, etc., each user may also choose an option to include narrative audio-only playback which describes visual aspects of what would normally be seen in the video, but is not seen for the audio-only content since the visual portion is removed.

By way of example, FIG. 1 conceptually illustrates a cloud-network architecture of a narration-enhanced audio-only content delivery system 100 that is configured to extract an audio-only content track from audio-visual content, extract a narrative track from the audio-visual content or generate a narrative track describing the audio-visual content, generate a composite narration-enhanced audio-only content item that combines the extracted audio-only content track with the narrative track, store, in a service database, each of the extracted audio-only content track, the narrative track, and the composite narration-enhanced audio-only content item, and deliver the extracted audio-only content track or the narration-enhanced audio-only content item to a user for listening playback.

The cloud-network architecture of a narration-enhanced audio-only content delivery system 100 shown in this figure includes a plurality of narration-enhanced audio-only content delivery cloud servers 110 and a source file upload storage and extracted audio and narration file cloud database 120. In some embodiments, the plurality of narration-enhanced audio-only content delivery cloud servers 110 comprise a cloud narration-enhanced audio-only content delivery cloud server that hosts a cloud application service, an audio-visual content item retrieval manager, an audio-only content extraction engine, a narration track generator, and a multi-track editing system for generating narration-enhanced audio-only content items.

In some embodiments, the plurality of narration-enhanced audio-only content delivery cloud servers 110 are configured to extract audio-only content from audio-visual content items and provide the audio-only content to users for listening playback. In some embodiments, the plurality of narration-enhanced audio-only content delivery cloud servers 110 connect to various web services that stream various audio-visual content items (also referred to as "video streaming platforms") and extract audio-only content from audio-visual content items requested by users. In some embodiments, the requesting user provides an identifiable name of an audio-visual content item that is accessible as a video data stream from a video streaming platform. In some embodiments, the plurality of narration-enhanced audio-only content delivery cloud servers 110 retrieves the audio-visual content item by streaming the video from the video streaming platform. While the video is streaming or after the audio-visual content item is retrieved, the plurality of narration-enhanced audio-only content delivery cloud servers 110 extract the audio-only content track from the particular audio-visual content item.

In some embodiments, the source file upload storage and extracted audio and narration file cloud database 120 is configured to store extracted audio-only content tracks, narrative tracks, and composite narration-enhanced audio-only content items. In some embodiments, the source file upload storage and extracted audio and narration file cloud database 120 is further configured to temporarily store audio-visual content files uploaded by users. In some embodiments, the source file upload storage and extracted audio and narration file cloud database 120 removes each uploaded audio-visual content file after the plurality of narration-enhanced audio-only content delivery cloud servers 110 extracts the audio-only content from the uploaded audio-visual content file.

The cloud-network architecture of a narration-enhanced audio-only content delivery system 100 shown in this figure also demonstrates an exemplary narration-enhanced audio-only content item 130 which is transmitted to a mobile device 140 of a user for audible playback in a mobile application 150 ("mobile app 150") running on the mobile device 140. The user may wear ear pods 160 or headphones to listen to the narration-enhanced audio-only content item 130. The ear pods 160 or headphones (or other audio output device, such as speaker) would be connected to the mobile device 140 via wired connection or wirelessly, such as through a Bluetooth wireless connection.

In some embodiments, the requesting user uploads a particular audio-visual content file to the source file upload storage and extracted audio and narration file cloud database 120 and the plurality of narration-enhanced audio-only content delivery cloud servers 110 retrieves the particular audio-visual content file from the source file upload storage and extracted audio and narration file cloud database 120 to extract the audio-only content track from the particular audio-visual content file.

To use the narration-enhanced audio-only content delivery system and process of the present disclosure, a user installs the mobile app-implementation on a mobile device and launches it to obtain audio-only content to enjoy for listening playback of their favorite movies, TV episodes, documentary shows, instructional/guidance videos, or other video-based (or audio-visual) content. Further details of using the narration-enhanced audio-only content delivery system are described next, by reference to FIG. 2.

Figure 2:
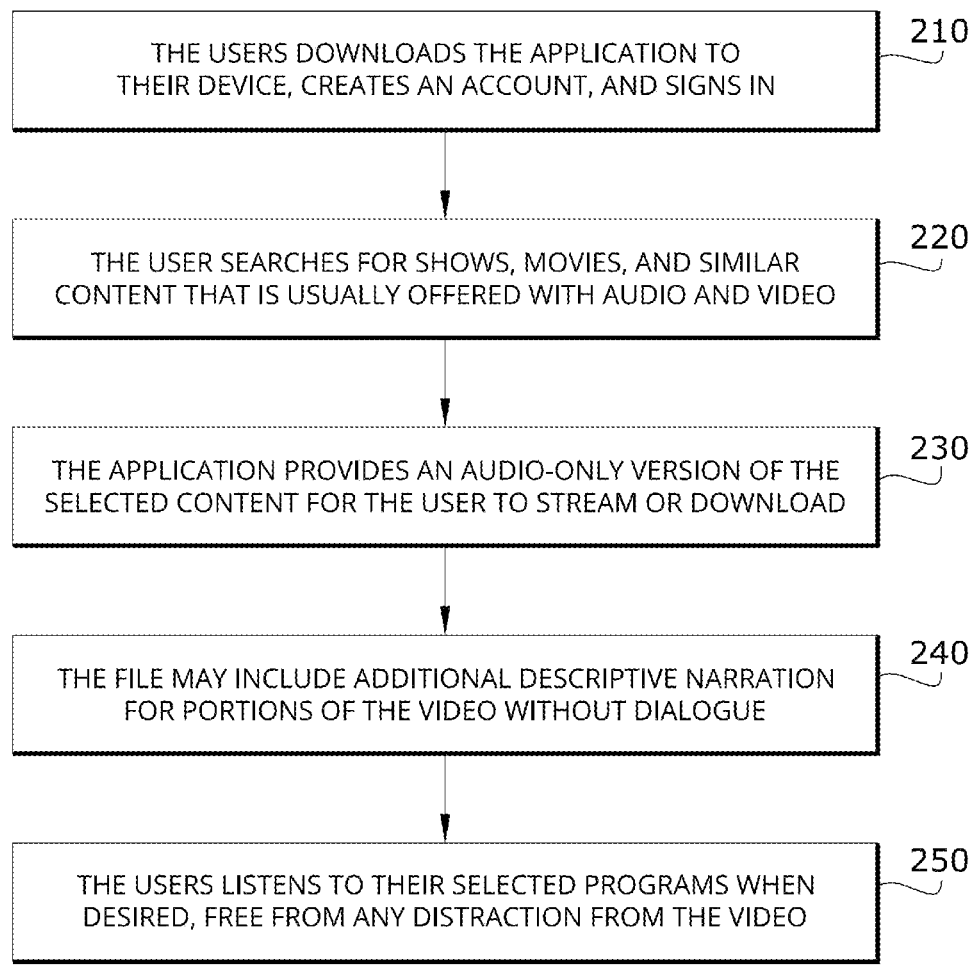
FIG. 2 conceptually illustrates a narration-enhanced audio-only content delivery process in some embodiments.

Specifically, FIG. 2 conceptually illustrates a narration-enhanced audio-only content delivery process 200. As shown in this figure, the narration-enhanced audio-only content delivery process 200 starts when a user downloads the mobile app to their mobile device (at 210). If the user is new to the mobile app, then the user would create an account to start interacting with the mobile app. If the user already has an account, then the user only needs to sign in to start interacting with the mobile app.

Next, the narration-enhanced audio-only content delivery process 200 proceeds to a step at which the user searches for audio-visual content of their choice (at 220). For example, the user may search for shows, movies, documentaries, guidance videos, instructional videos, and other similar audio-visual content. In some cases, the search also finds existing audio-only files that lack video. In some of these cases, a mere image or series of non-video images are presented during playback with an audio track. In any event, the items found during the search allows the user to select the audio-visual content item(s) of choice for extraction of the audio-only portion of the content.

After the user selects one of the search results, the narration-enhanced audio-only content delivery process 200 moves to the next step of extracting the audio-only content and providing the audio-only content of the selected audio-visual content item to the user to stream or download (at 230). Also, the narration-enhanced audio-only content delivery process 200 of some embodiments stores the extracted audio-only content in the service database and sends the user a link to stream or download the audio-only content from the service database. While storing the audio-only content in the service database, the narration-enhanced audio-only content delivery process 200 also stores a narration track of the audio-visual content item selected from the search results. This is described next.

Specifically, the narration-enhanced audio-only content delivery process 200 stores the descriptive narration audio track in the service database and also generates a composite narration-enhanced audio-only content item which is made available to the user (at 240). The composite narration-enhanced audio-only content item, also stored in the service database and made available to download or stream, provides additional descriptive narration for portions of the audio-visual content, but without narration of the dialogue, since the dialogue would be extracted as audio-only content from the audio-visual content item.

During a final step of the narration-enhanced audio-only content delivery process 200, the user accesses the link to the audio-only content item or the composite narration-enhanced audio-only content item to listen during playback (at 250). The user's access may involve either downloading or streaming the audio audio-only content item or the composite narration-enhanced audio-only content item. The user may listen whenever he or she desires and, since the audio-only content item and the composite narration-enhanced audio-only content item do not include any video, visual imagery, or other visual aspects, the user can listen freely without visual distraction.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 3:
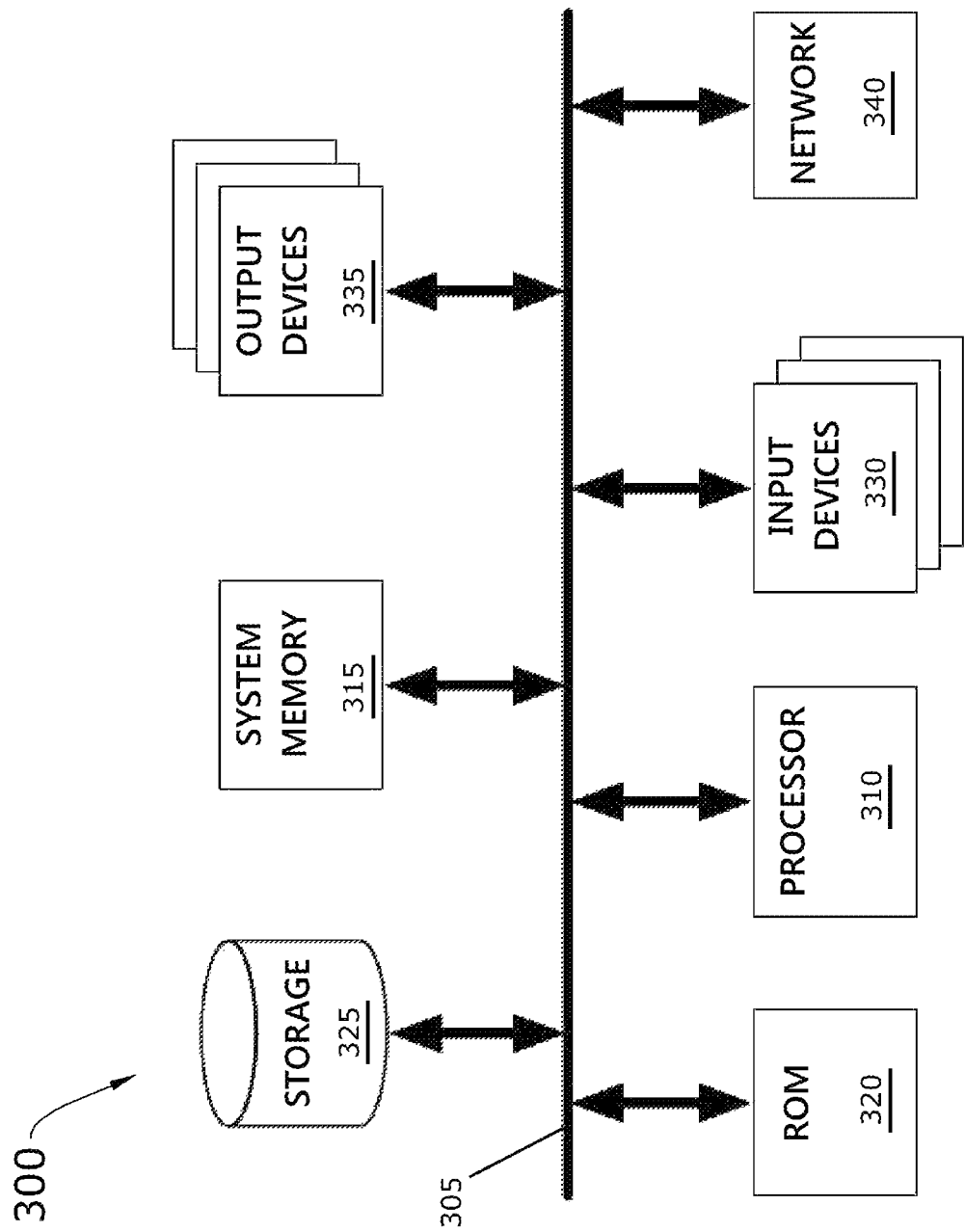
FIG. 3 conceptually illustrates an electronic system with which some embodiments of the invention are implemented.

FIG. 3 conceptually illustrates an electronic system 300 with which some embodiments of the invention are implemented. The electronic system 300 may be a computer, phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 300 includes a bus 305, processing unit(s) 310, a system memory 315, a read-only memory 320, a permanent storage device 325, input devices 330, output devices 335, and a network 340.

The bus 305 collectively represents all system, peripheral, and chipset buses that communicatively connect the numerous internal devices of the electronic system 300. For instance, the bus 305 communicatively connects the processing unit(s) 310 with the read-only memory 320, the system memory 315, and the permanent storage device 325.

From these various memory units, the processing unit(s) 310 retrieves instructions to execute and data to process in order to execute the processes of the invention. The processing unit(s) may be a single processor or a multi-core processor in different embodiments.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some embodiments of the invention use a mass-storage device (such as a magnetic or optical disk and its corresponding disk drive) as the permanent storage device 325.

Other embodiments use a removable storage device (such as a floppy disk or a flash drive) as the permanent storage device 325. Like the permanent storage device 325, the system memory 315 is a read-and-write memory device. However, unlike storage device 325, the system memory 315 is a volatile read-and-write memory, such as a random access memory. The system memory 315 stores some of the instructions and data that the processor needs at runtime. In some embodiments, the invention's processes are stored in the system memory 315, the permanent storage device 325, and/or the read-only memory 320. For example, the various memory units include instructions for audibly outputting the audio-only content with the added narration of the corresponding audio-visual content item, in accordance with embodiments of the invention. From these various memory units, the processing unit(s) 310 retrieves instructions to execute and data to process in order to execute the processes of some embodiments.

The bus 305 also connects to the input and output devices 330 and 335. The input devices enable the user to communicate information and select commands to the electronic system. The input devices 330 include alphanumeric keyboards and pointing devices (also called "cursor control devices"). The output devices 335 display images generated by the electronic system 300. The output devices 335 include printers and display devices, such as liquid crystal displays (LCD) and organic light emitting diode (OLED) displays. Some embodiments include devices such as a touchscreen that functions as both input and output devices.

Finally, as shown in FIG. 3, bus 305 also couples electronic system 300 to a network 340 through a network adapter (not shown). In this manner, the computer can be a part of a network of computers (such as a local area network ("LAN"), a wide area network ("WAN"), or an intranet), or a network of networks (such as the Internet). Any or all components of electronic system 300 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 2 conceptually illustrates a process in which the specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Similarly, the narration-enhanced audio-only content delivery system can be configured in other ways. For example, configuring the narration-enhanced audio-only content delivery system to provide only audio guidance or another aspect from associated audio-visual content or methodologies. Thus, one of ordinary skill in the art would understand that the invention is not to be limited by the foregoing illustrative details, but rather is to be defined by the appended claims.

I claim:

1. A narration-enhanced audio-only content delivery system comprising:
   a plurality of narration-enhanced audio-only content delivery cloud servers that are configured to extract audio-only content from audio-visual content, wherein the plurality of narration-enhanced audio-only content delivery cloud servers comprise a cloud narration-enhanced audio-only content delivery cloud server that hosts a cloud application service, wherein the cloud narration-enhanced audio-only content delivery cloud server comprises an audio-visual content item retrieval manager and an audio-only content extraction engine available to devices that connect to the cloud application service over a network;
   a source file upload storage and extracted audio and narration file cloud database that is communicably connected to the cloud narration-enhanced audio-only content delivery cloud server and configured to store audio-only content extracted by the audio-only content extraction engine from audio-visual content retrieved by the audio-visual content item retrieval manager; and
   a mobile device operable by a user and comprising a processor, a memory, and an installed mobile app that is configured to receive an identifiable name of an audio-visual content item, search for the audio-visual content item on a video streaming platform based on the identifiable name, present search results of a plurality of audio-visual content items found during the search, receive a selection of a particular audio-visual content item in the plurality of audio-visual content items presented in the search results, and playback a particular audio-only content file extracted from the particular audio-visual content item.

2. The narration-enhanced audio-only content delivery system of claim 1, wherein the cloud narration-enhanced audio-only content delivery cloud server further comprises a narration track generator, and a multi-track editing system for generating narration-enhanced audio-only content items.

3. The narration-enhanced audio-only content delivery system of claim 2, wherein the audio-visual content item retrieval manager is configured to retrieve the particular audio-visual content item upon selection from the search results and the audio-only content extraction engine is configured to extract, after the particular audio-visual content is retrieved, an audio content track from the particular audio-visual content and generate the particular audio-only content file based on the extracted audio content track.

4. The narration-enhanced audio-only content delivery system of claim 3, wherein the narration track generator is configured to generate a narrative describing visual elements of the particular audio-visual content item.

5. The narration-enhanced audio-only content delivery system of claim 4, wherein the multi-track editing system for generating narration-enhanced audio-only content items is configured to generate a composite narration-enhanced audio-only content item by combining the generated narrative with the particular audio-only content file.

6. The narration-enhanced audio-only content delivery system of claim 2, wherein the cloud narration-enhanced audio-only content delivery cloud server is configured receive the selection of the particular audio-visual content item and connect to a particular video streaming platform that provides the particular audio-visual content item.

7. The narration-enhanced audio-only content delivery system of claim 1, wherein the particular audio-visual content item with the identifiable name comprises a video content item with visual and audible content that is accessible as a video data stream from a video streaming platform.

8. The narration-enhanced audio-only content delivery system of claim 1, wherein the particular audio-visual content item with the identifiable name comprises an audio content item with a single image and audible content that is accessible as an audio content data stream from a video streaming platform.

9. The narration-enhanced audio-only content delivery system of claim 1, wherein the mobile app is further configured to receive an audio-visual content file upload selection of a local audio-visual content item stored in the memory of the mobile device, transmit the local audio-visual content item to the source file upload storage and extracted audio and narration file cloud database to temporarily store, receive a link to a corresponding audio-only content file comprising audio content extracted from the local audio-visual content item temporarily stored in the source file upload storage and extracted audio and narration file cloud database, and download the corresponding audio-only content file from the source file upload storage and extracted audio and narration file cloud database upon selection of the link.

* * * * *